United States Patent Office 2,892,066
Patented June 23, 1959

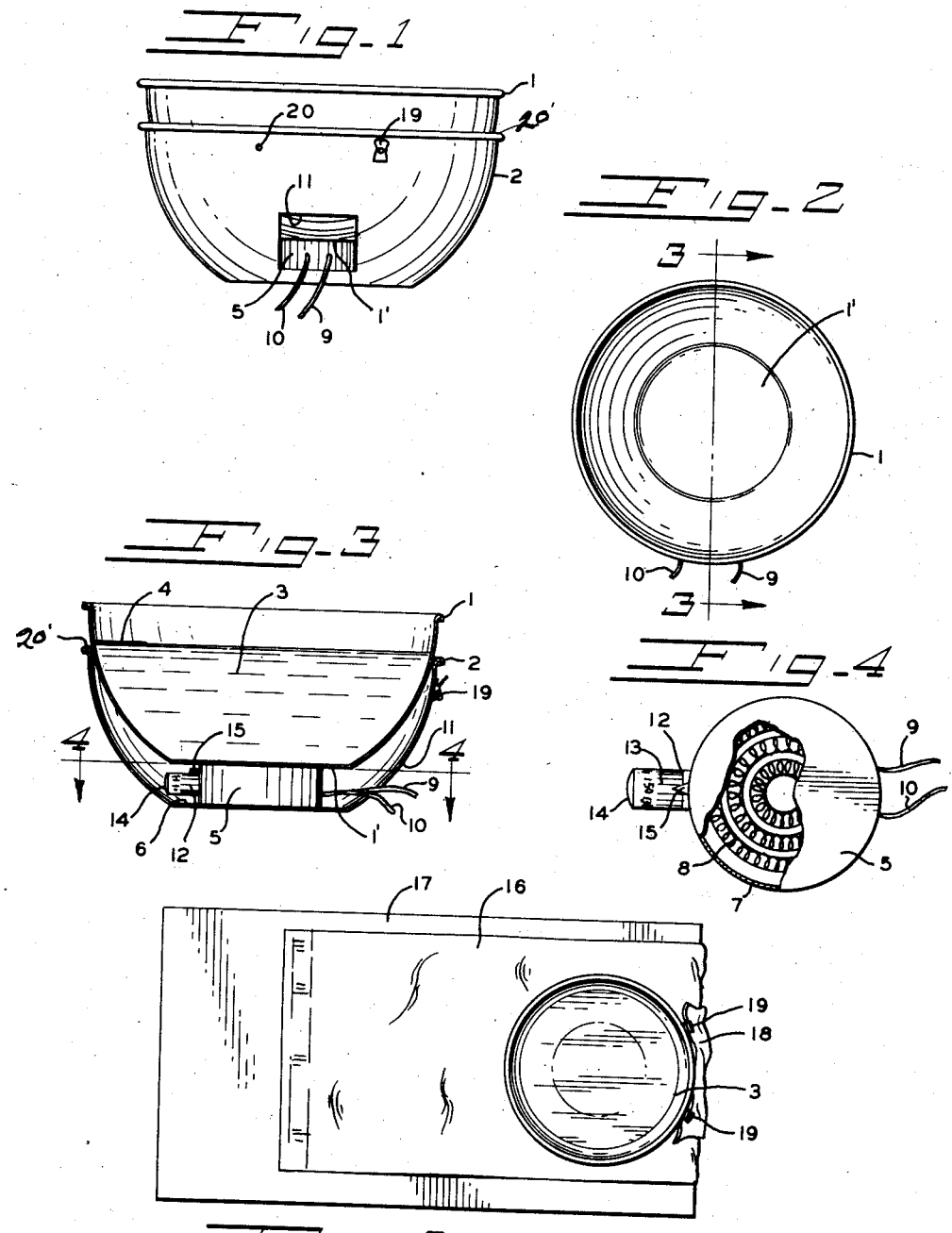
June 23, 1959    H. A. SPRINGER    2,892,066
SURGICAL SPONGE HOT LIQUID BATH
Filed Feb. 7, 1957
INVENTOR.
HENRY A. SPRINGER

2,892,066

SURGICAL SPONGE HOT LIQUID BATH

Henry A. Springer, Cincinnati, Ohio

Application February 7, 1957, Serial No. 638,817

1 Claim. (Cl. 219—43)

The invention relates to means adapted to keep and maintain a saline solution, or other liquid, at a constant or predetermined temperature during a surgical operation on a human being, or other live thing, whereby sterile surgical towels and sponges used to absorb blood and other secretions of the patient, also, are kept sterile and at a constant or predetermined temperature.

In the past considerable difficulty, inconvenience and trouble has been experienced by surgeons, physicians, nurses and others in providing a saline solution, water, or other liquid, at a desired temperature for immersion of surgical towels or sponges during an operation on a human being or other living being. This is so because the temperature of the saline solution must remain below the heating point that would destroy normal live tissue when the soaked saline sponge is placed in contact with the tissue. Moreover, the apparatus must be kept sterile so that infection will not be transmitted to the wound. In the past the ordinary method of pouring boiling water or liquid into a basin or receptacle, then soaking the surgical sponges, removing the sponges, manually ringing out the excess liquid and opening the sponge to release the excess heat was very unsatisfactory and inaccurate. This is so particularly because the liquid in a basin or receptacle cools rapidly and in prolonged operations the frequent changing of the liquid was time consuming, inconvenient and unsatisfactory.

Therefore, an important object of the invention is to provide a predetermined continuous heat to a given quantity of water or saline liquid so that when a surgical sponge is placed into the bath the temperature in a sponge immersed therein will be at a constant and predetermined temperature.

These saline hot sponges are placed in the wound during the operation to produce hematosis from capillary bleeding.

Another important object of the invention is to assist a nurse, or other assistant of the surgeon, to provide sterile hot sponges of the proper temperature immediately and without delay when desired and required by the surgeon.

Further and other objects of the invention will be apparent from a careful study, and consideration of the accompanying specification, claim, and drawings.

The invention consists in the combination of the elements, arrangement of the parts and in the details of the construction, as hereinafter claimed.

In the drawings:

Fig. 1 is a side view of the invention;

Fig. 2 is a top view of the same;

Fig. 3 is a section taken on line 3—3 of Fig. 2;

Fig. 4 is a top view of the heating element, with parts broken away, and

Fig. 5 is a top view of a table showing the invention in use.

In the preferred construction of the invention, I provide the upper receptacle, sponge bath or basin 1 received in the lower receptacle or basin 2. The upper sterile receptacle 1 is adapted to be filled with a suitable sterile saline solution or liquid 3 to the mark 4 on the inner surface of the receptacle 1. The bottom 1' of the upper receptacle rests upon the top of the heating unit 5 which rests upon the upper surface of the bottom 6 of the lower receptacle 2.

The heating unit 5 comprises the casing 7 having therein the usual heating coils 8 having connections with the electric current conductors or wires 9 and 10 which are connected with suitable outside source of electric current supply. The wires 9 and 10 pass through the aperture 11 in the side of the receptacle 2.

Incorporated with the heating unit 5 is the usual or conventional thermostat 12 having the indicia or graduations 13 on its manually operative cylindrical handle 14. The purpose of the graduations 13 and the pointer 15 on the casing of the heating unit is to enable the operator to maintain the heating unit 5 at a predetermined temperature depending upon the location of the pointer 15 with respect to the graduations 13. For example, when the handle 14 is manually turned or rotated so that the graduation 13, having the numeral 150° thereon, is opposite the pointer 15, the temperature of the heating unit 5 will remain at 150° F. Therefore, the temperature of the saline solution 3 in the upper receptacle 1 will constantly remain at 150° F., or go no higher than 150°. If it is desired by the operator to have the temperature of the saline solution in the upper receptacle 1 more or less than 150° F., the cylindrical handle 14 is manually rotated to cause the proper graduation 13, on the handle 14, to be positioned opposite or in alignment with the pointer 15 whereby the conventional thermostat of the handle 13 will maintain the heating unit 5 and the saline solution 3 in the upper receptacle 1 at the required or desired temperature.

During use of the invention the lower receptacle 2 is placed on a sanitary towel 16 on the table 17, and another sanitary towel 18 hangs from the top edge of the receptacle down and over the wires 9 and 10 and the aperture 11 in the side of the receptacle 2. The top edge of the towel 18 is supported by the clips 19 having fingers received in holes 20 in the top edge of the receptacle 2.

The rim 20, of the lower receptacle 2, fits tightly against the outer side of the upper receptacle 1 thereby sealing the rim 20 with respect to the receptacle 1 whereby heat from the heating element cannot pass out of the top of the lower receptacle 2, nor between the upper and outer receptacle.

Also, the towel 18 covers the aperture 11 whereby practically all heat from the heating unit is retained within the receptacle 2 for heating the liquid in the receptacle 1. Moreover, since the rim 20 seals the space between the receptacles 1 and 2 no heat can escape therethrough to burn the hands of an operator who puts in and removes towels from the liquid 3. And any water which may drip or run down the outer side of the upper receptacle cannot enter the lower receptacle.

Assume that it is desired to maintain the liquid, or saline solution, within the receptacle 1, at a constant temperature of 150° F. First, the cylindrical handle 14 is manually rotated until a graduation 13, having thereon the 150° F. indication 17, is opposite to or in alignment with the marker 15, as shown in Fig. 4. The heating unit 5 immediately absorbs heat through the electric wires 9 and 10 until the temperature of the unit 5 is 150° F. Then the thermostat automatically cuts off the electric current to the coils 8 until the temperature of the heating unit, falls below 150° F. When the thermostat automatically operates to allow electric current through the wires 9 and 10 to effect the coils 8 to cause the heating unit to have a temperature of 150° F. thus imparting this degree of heat to the bottom of the receptacle 1 which in turn imparts heat to the liquid 3 within the receptacle 1.

When the nurse, or other person, immerses a surgical sponge into the liquid 3 the temperature of the liquid may be reduced particularly if the temperature of the sponge is less than 150° F. However, immediately when the temperature of the liquid in the receptacle 1 falls below 150° F. temperature the bottom of the receptacle 1, also, falls below 150° F. with the result that the temperature of the heating unit's top, which supports the receptacle 1, also is reduced whereby due to automatic operations of the thermostat electric current is received through the wires 9 and 10 into the heating unit's coils 8 whose temperature automatically is increased to 150° F. whereby the same temperature is imparted to the bottom of the receptacle 1, which imparts heat to the liquid 3 within the receptacle 1. Therefore, irrespective of the number of surgical towels or sponges inserted into the liquid, or saline solution 3, and irrespective of the temperature of the towels or surgical sponges the thermostat automatically keeps the temperature of the heating unit 5 at the same temperature indicated on the respective graduation 13 in alignment with the pointer 15, and the heating unit therefore transmits this same temperature to the bottom of the receptacle 1, and to the liquid therein.

I have devised and invented what I believe to be a novel and useful device which embodies the features of advantage above enumerated. And I have shown and described the preferred embodiments of my invention which will give in actual practice satisfactory results for the intended purposes. However, it is to be understood that the herein described invention is susceptible of modifications in various particulars. Hence, I wish to emphasize that I desire to include in this application all equivalents and substitutes that may be fairly considered to come within the scope and purview of the invention, as defined in the claim.

What I claim as new and desire to secure by Letters Patent is:

A surgical device comprising a sponge bath, a constant temperature surgical sponge bath supporting heater comprising an open top basin capable of receiving and having its open top closed by said sponge bath, said basin having a side aperture provided therein, a thermostatically controlled heating element mounted in said basin and positioned for being in contact with said bath, means for connecting said heating element to a source of electrical current extending through said basin aperture, a plurality of clips connected to the exterior of said basin adjacent said basin aperture adapted to detachably support a sanitary towel over the basin aperture for retaining heat within said basin.

References Cited in the file of this patent

UNITED STATES PATENTS

| | | |
|---|---|---|
| 910,479 | Andrews | Jan. 19, 1909 |
| 1,373,116 | Bunce | Mar. 29, 1921 |
| 2,682,602 | Huck | June 29, 1954 |
| 2,749,426 | Schwaneke | June 5, 1956 |
| 2,801,325 | Pearce | July 30, 1957 |